United States Patent Office 3,095,399
Patented June 25, 1963

3,095,399
POLYESTERS CONTAINING ISOCYANATE GROUPS
Erwin Müller, Otto Bayer, Hugo Wilms, Franz von Spulak, and Manfred Theis, Leverkusen, Germany, assignors, by mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Feb. 13, 1959, Ser. No. 793,221
6 Claims. (Cl. 260—33.6)

This invention relates to a process for the preparation of aromatic polyisocyanates and, more particularly to the preparation of aromatic polyisocyanates containing ester groups.

Heretofore, aromatic monoisocyanates containing ester groups have been produced. Thus, esters of beta-isocyanatoacetic acid and the m-substituted isocyanatobenzoic acid esters have been described.

Aromatic polyisocyanates containing ester groups have also been produced by the reaction of organic polyisocyanates with hydroxyl polyesters, using a large excess of organic polyisocyanate based on the terminal hydroxyl groups of the polyester. However, this process produces polyisocyanates containing urethane groups as members linking the carbon atoms in addition to the ester groups. Predominately, diisocyanates are formed when starting from linear polyesters, and products containing more than two isocyanate groups are formed when using branched polyesters.

In these prior processes for the production of polyisocyanates, the products are not of definite composition because of premature cross-linking reactions. The cross-linking reactions, leading to non-uniform compositions with regard to both linear and branched products, adversely affects the storage stability of the polyisosyanates through secondary reaction of the isocyanate groups with the urethane groups.

It is an object of this invention to provide a process for the preparation of organic polyisocyanates containing ester groups. Another object of this invention is to provide a process for the preparation of organic polyisocyanates containing ester groups which do not have urethane groups linking the carbon chains. Another object of this invention is to provide a process for the preparation of organic polyisocyanates containing ester groups which are of definite and uniform composition.

These objects and others, which will become apparent from reading the following disclosure, are accomplished, in accordance with the invention, generally speaking, by providing a process for the preparation of organic polyisocyanates wherein phosgene is reacted with an aromatic polyamine having ester groups attached to the aromatic ring through the carbon atom of the ester group and to a separate hydrocarbon radical through the oxygen atom of the ester group. Thus, this invention contemplates the preparation of aromatic polyisocyanates containing one or more ester groups by the reaction of phosgene with aromatic amino esters with at least two amino groups and at least one ester group. These amino esters or aromatic polyamines can be looked at as being derived from the condensation of amino benzoic acids with mono-, di-, tri-, or higher polyhydric alcohols.

The aromatic polyamines suitable for starting materials in the process of the present invention may be represented by the following generic formulae:

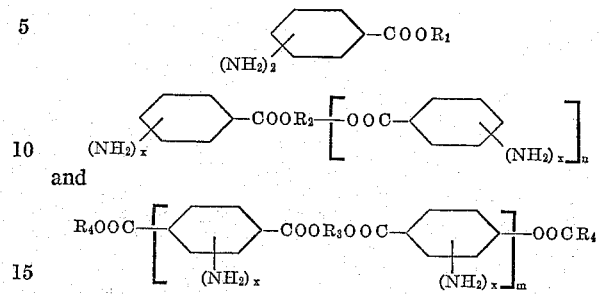

In these formulae $R_1$ is selected from alkyl and aralkyl groups, $R_2$ is a higher valent hydrocarbon residue which may be interrupted by ether oxygen atoms, $R_3$ is an alkylene radical, $R_4$ is an alkyl group, $x$ represents one of the integers 1 and 2, $n$ corresponds to the valency of $R_2$ less one, $m$ is an integer making up for a molecular weight of the whole compound of at most 3000.

Thus, the aromatic polyamines suitable as reactants in the process of the present invention to prepare the corresponding polyisocyanates (these may be represented by replacing the —$NH_2$ groups in the foregoing formula with —NCO groups) by reaction with phosgene may be, for example, the diamino benzoic acid esters, for example, the 3,5-diamino benzoic acid methyl or ethyl ester. Other alkyl esters such as the propyl, isobutyl, or dodecyl esters are as well suitable as aralkyl esters, for instance, the benzyl ester.

Further examples of aromatic amino esters are the amino benzoic acid esters of polyhydric alcohols such as ethylene glycol, diethylene glycol, triethylene glycol, trimethylol propane, 1,2-propylene glycol, 1,3-propylene glycol, dipropylene glycol, 1,2-butylene glycol, 1,3-butylene glycol, 1,4-butylene glycol, 1,6-hexane diol, pentaerythritol, 1,2,6-hexanetriol, and 1,12-dodecane diol. If such diesters or higher esters are prepared it is not necessary to start from diamino benzoic acid esters. o,m,p-Monoamino benzoic acid esters will serve the purpose of the invention as well since these esters contain at least two amino groups. The starting materials can also be produced by incorporating amino benzene dicarboxylic acids as the acid component into polyesters. The various mono- and diamino phthalic acids including isophthalic and terephthalic acids can be used in the preparation of such polyesters. The alcoholic component can be, for instance, ethylene glycol, the propylene glycols, diethylene glycol, dipropylene glycol, the butylene glycols, or 1,6-hexane diol. The polyesterification is performed with such an amount of components that polyesters with free carboxylic acid groups result which carboxylic acid groups are in a second reaction step removed by alcoholysis. Acetic anhydride, acetyl chloride, or other lower or higher aliphatic acid anhydrides or chlorides can be employed therefor.

Instead of the various amino acids the corresponding nitro aromatic carboxylic acids can be used. For instance, dinitro isophthalic acid may be condensed with any of the aforementioned alcohols and the resulting polyester thereafter reduced to form the corresponding polyamine. To give a further example, m-dinitro benzoic acid can be esterified with methanol or ethanol and the resulting ester reduced to give the 3,5-diamino benzoic acid methyl or ethyl ester.

The phosgenation of the aromatic polyamines containing ester groups is carried out in a known manner using the conventional phosgenation techniques, for example, by a cold phase-hot phase phosgenation, or alternatively by the hydrochloride process, the corresponding amine hydrochloride being phosgenated. It can be carried out continuously or intermittently and, preferably, use is made of an inert solvent, such as, chlorobenzene, o-dichlorobenzene or nitrobenzene. The process disclosed in United States Patent 2,680,127 could be used, for example.

The aromatic polyisocyanates containing ester groups obtainable by the present process are, for the major part, in crystalline form where diisocyanates are concerned and oily to resinous products where polyisocyanates of higher function are concerned. These products have good solubility in the conventional solvents, such as, hydrocarbons or chlorinated hydrocarbons. All products of the process are distinguished from the polyisocyanates containing ester groups hitherto known in having exceptional stability in storage, which stability is not inferior in any way to that of the simple monomeric isocyanates, such as, tolylene diisocyanate. In particular, the polyisocyanates containing ester groups produced by the process of this invention are excellently suitable as adhesive and, by comparison with the adhesive formerly used for this purpose, for example, by comparison with triphenyl methane triisocyanate and other polyisocyanates, such as, can be obtained by the reaction of polyhydric alcohols with an excess of diisocyanates, they are distinguished by the fact that the adhesive bonds produced therewith show no tendency to discoloration, which is of great importance for many adhesive purposes, and especially for those adhesive bonds, which should be transparent. The polyisocyanates containing ester groups produced by the process of this invention have a good efficacy in rubber adhesive solutions consisting of natural rubber or synthetic rubber, such as, chloroprene rubber, butadiene-acrylonitrile rubber or butadiene-styrene rubber. The adhesive solutions produced therewith have the property of setting rapidly, they produce a considerable improvement in the heat-resistance of the joint formed and they show good bonding values after being stored in the usual way for about 24 hours at room temperature. Any desired adhesive bonds can be produced with them, for example, rubber to rubber, rubber to leather, rubber to textiles and rubber to synthetic resins of various types. The polyisocyanates containing ester groups, produced by the process of this invention are relatively non-toxic. The toxicological properties of the new polyisocyanates containing ester groups permits of them to be used on a large technical scale, in contrast to many of the hitherto known polyisocyanates.

The products of the process, can, moreover, be used in all cases where diisocyanates and polyisocyanates have formerly been employed, such as, for example, for modifying polyhydroxyl compounds, for cross-linking thermoplastics or for the production of lacquer coatings.

In order to better describe and further clarify the invention, the following are specific embodiments thereof:

*Example 1*

To produce the starting material, about 1 kg. of 3,5-dinitrobenzoic acid in about 5 liters of methanol is converted into the methyl ester, after saturation with hydrochloric acid gas, by boiling for about 6 hours under reflux and this methyl ester is reduced at about 50–70° C. in approximately a 20% solution of tetrahydrofuran at about 20–40 atm. in the presence of Raney nickel.

About 115 g. of the resulting diaminobenzoate methyl (M.P. 130–133° C. from methanol) are introduced into a solution of about 750 g. of phosgene in about 1500 cc. of chlorobenzene prepared while cooling with ice and common salt. The mixture is stirred for about 12 hours and heated while passing through phosgene; the phosgenation proceeds under reflux until the evolution of HCl has terminated. A clear solution is formed and is concentrated by evaporation in vacuo after blowing through nitrogen and after clarifying with animal charcoal. About 111 g. of methyl 3,5-diisocyanatobenzoate B.P. 140° C. 0.03 mm. Hg/M.Pt. 68° C. remain.

Under the same conditions, it is also possible to phosgenate the benzyl ester (M.Pt. 112° C. from methanol) obtainable from about 500 g. of 3,5-dinitrobenzoic acid, about 1.5 liters of benzyl alcohol and about 6 cc. of concentrated sulphuric acid by heating for about 11 hours at about 130° C., after having previously transformed the said ester into benzyl 3,5-diaminobenzoate (M.P. 94° C.). The M.Pt. of the benzyl 3,5-diisocyanatobenzoate is about 60–63° C.

A natural rubber solution (about 1:4 in benzene), consisting of about 100 parts by weight of sheet rubber, about 40 parts by weight of white zinc, about 40 parts by weight of zinc oxide and about 5 parts by weight of colophony, is mixed with about a 20% solution in methylene chloride of the polyisocyanate as prepared above. To approximately each 100 parts by weight of the rubber solution, about 10 parts by weight of the polyisocyanate solution are used. Vulcanized rubber strips with a width of about 20 mm. are stuck with an overlap of about 1 cm., the adhesion points having previously been roughened. Both the parts to be stuck are each coated twice with the adhesive solution and each coating is dried for about 10 minutes at approximately room temperature. The areas bearing the adhesive are then pressed together for a short time. The strength factors of the adhesive bond, depending on storage time, are:

| Storage time: | Shearing strength in kg. abs. |
| --- | --- |
| 30 mins. | 33 |
| 1 hour | 34 |
| 2 hours | 35 |
| 4 hours | 36 |
| 8 hours | 38 |
| 24 hours | 39 |
| 48 hours | 42 |

The heat resistance of the bond is about 30 kg. absolute after a storage time of about 48 hours at about 40° C. and about 26 kg. absolute at about 50° C.

*Example 2*

In order to produce the starting material, about 500 g. of dinitrobenzoic acid are suspended in about 2 liters of diethylene glycol, about 5 cc. of concentrated sulphuric acid are then added and the mixture is heated for about 6 hours under reflux at about 180° C. After cooling, the mixture is poured into water and the precipitated ester is filtered off with suction. Yield about 560 g., M.P. 76° C. (from methanol). The aminoester obtained after the catalytic hydrogenation is a yellowish brown oil.

About 200 g. of this oily polyamine are introduced into a solution of about 800 g. of phosgene in about 2 liters of chlorobenzene. The further processing is as described in Example 1. After the resulting reaction solution has been concentrated by evaporation in vacuo, about 265 g. of a yellowish brown oil, which is soluble in methylene-chloride and which has an —NCO content of about 41.8% remains.

A rubber solution is prepared from about 100 parts by weight of a chloroprene rubber and about 4 parts by weight of zinc dimethyl dithiocarbamate, the said components being dissolved in the ratio of about 1 to about 2.5 in a solvent mixture consisting of about 3 parts by weight of trichloroethylene and about 7 parts by weight of ethyl acetate. The rubber solution is thereafter mixed with about 10% of about a 20% solution of the polyisocyanate in methylene chloride, prepared as above. A sample for adhesive purposes is prepared as described in Example 1. The bonding values obtained at room temperature are:

Storage time: Shearing strength in kg. abs.
30 mins _____ 15
1 hour _____ 18
2 hours _____ 22
4 hours _____ 25
8 hours _____ 34
24 hours _____ 42
48 hours _____ 50

The heat resistance is about 26 kg. absolute after storing for about 48 hours at about 40° C. and about 18 kg. absolute at about 50° C.

*Example 3*

To produce the starting material, 106 grams of diethylene glycol are introduced dropwise at 60–70° C. into 371 grams of m-nitrobenzoyl chloride dissolved in 600 cc. of toluene. The mixture is then heated for 6 hours under reflux. On cooling, the nitroester separates out, and this is again washed with soda solution to remove any acid which may be present. M.Pt. 90–93° C. (from ethyl acetate). The polyamine obtained by catalytic reduction of the nitroester melts at 120–123° C. (from methanol). Yield 205 grams.

The phosgenation is carried out under the conditions indicated in Example 1 and yields 227 grams of a viscous oil which has an NCO content of 21.4% (calculated 21.2%).

*Example 4*

To produce the starting material, 211 grams of 5-nitrobenzene-1,3-dicarboxylic acid and 156 grams of diethylene glycol are thermally esterified while passing over carbon dioxide at temperatures up to 180° C. After distilling off the water, condensation is continued in vacuo at 190° C./12 mm. Hg until an acid number of 5 is reached. After cooling to 100° C., 150 cc. of acetic anhydride are added to the melt. This is then boiled under reflux for 6 hours. The terminal hydroxyl groups are thereby acetylated. After evaporating the excess acetic acid anhydride in vacuo, the polyester containing nitro groups thus obtained is left as a waxy product which is catalytically reduced as described in Example 1. The polyester containing amino groups is a yellowish-brown oil.

190 grams of the oil are introduced into a solution of 800 grams of phosgene in 2.5 litres of chlorobenzene and phosgenated in accordance with the procedure indicated in Example 1. The highly viscous oil remaining after evaporating the solvent has an NCO content of 14.7% and can be kept without any change while dissolved in methylene chloride. Yield 226 grams.

*Example 5*

To 1.34 kilograms of trimethylol propane are added 0.2 gram of sodium and 1.32 kilograms of ethylene oxide at 160–170° C. 2.66 kilograms of trioxethyl trimethylol propane are obtained as a yellow oil (OH number 630).

1.59 kilograms of trioxethyl trimethylol propane are esterified with 2.82 kilograms of m-nitrobenzoic acid at temperatures up to 180° C. in an atmosphere of carbon dioxide. Water is split off at 160° C. If the temperature drops vacuum is applied and the condensation continued at 180° C./12 mm. Hg until an acid number of less than 5 is reached. About 290 cm.³ of water are split off. 4.1 kilograms of ester are obtained having an acid number of about 5.

2 kilograms of the ester are hydrogenated in the presence of 100 grams of Raney nickel after being dissolved in 7.6 kilograms of methanol. The autoclave is heated to 90° C., hydrogen pressure is 20 atm. After the hydrogenation has been completed the catalyst is filtered off and the methanol and water are distilled off. The amine obtained is dissolved in the equal amount of water-free chlorobenzene.

560 grams of the 50% chlorobenzene solution of the amine are introduced into a solution of about 800 grams of phosgene in about 1.5 litres of chlorobenzene while cooling with ice and common salt. The mixture is stirred for 4–5 hours and then heated while passing through phosgene. The temperature is increased up to 105–110° C. The phosgenation proceeds under reflux until the evolution of HCl has terminated. A clear solution is formed and is concentrated by evaporation in vacuo after blowing through nitrogen. The resulting isocyanate is a viscous oil having an NCO content of 20–21%.

Although the examples relate to only some of the initial reactants more fully disclosed above, it is to be understood that any of the polyamines containing ester groups could have been used in place of the particular reactants disclosed in the examples for reaction with phosgene in the novel process of the present invention.

Although the invention has been described in considerable detail in the foregoing examples for the purpose of illustration, it is to be understood that such detail is solely for this purpose and that variations can be made therein by those skilled in the art without departing from the spirit and scope of the invention except as is set forth in the claims.

What is claimed is:

1. A compound selected from the group consisting of

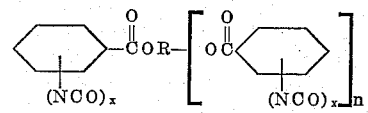

and

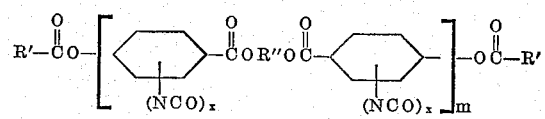

wherein R is an organic radical obtained by removing the —OH groups from an unsubstituted aliphatic polyhydric alcohol of up to 12 carbon atoms, R' is alkyl of 1 to 12 carbon atoms, R'' is alkylene of up to 12 carbon atoms, $n$ is an integer of from 1 to 4, $m$ is an integer making up a molecular weight for the whole compound of up to about 3000 and $x$ is 1 to 2.

2. A compound having the formula

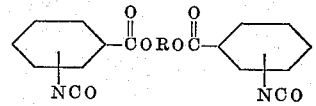

wherein R is an organic radical obtained by removing the —OH groups from diethylene glycol.

3. A compound having the formula

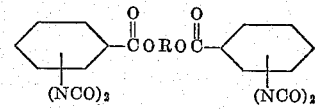

wherein R is an organic radical obtained by removing the —OH groups from diethylene glycol.

4. A compound having the formula

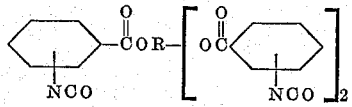

wherein R is an organic radical obtained by removing the hydroxyl groups from trimethylolpropane.

5. An organic solvent solution of an adhesive amount of a compound selected from the group consisting of

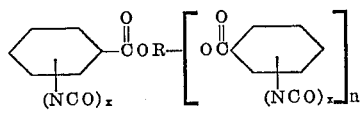

and

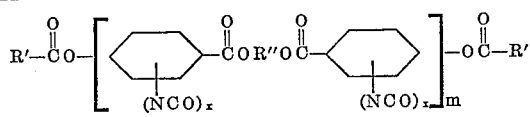

wherein R is an organic radical obtained by removing the —OH groups from an unsubstituted aliphatic polyhydric alcohol of up to 12 carbon atoms, R' is alkyl of 1 to 12 carbon atoms, R" is alkylene of up to 12 carbon atoms, $n$ is an integer of from 1 to 4, $m$ is an integer making up a molecular weight for the whole compound of up to about 3000 and $x$ is 1 to 2, said organic solvent being selected from the group consisting of hydrocarbons and chlorinated hydrocarbons.

6. An adhesive composition which comprises an organic solvent solution of an adhesive amount of a compound having the formula

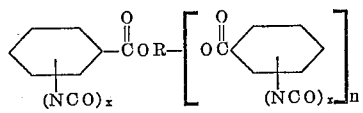

wherein R is an organic radical obtained by removing the —OH groups from an unsubstituted aliphatic polyhydric alcohol of up to 12 carbon atoms, $n$ is an integer of from 1 to 3, and $x$ is 1 to 2, said organic solvent being selected from the group consisting of hydrocarbons and chlorinated hydrocarbons.

References Cited in the file of this patent
UNITED STATES PATENTS

| | | |
|---|---|---|
| 1,960,251 | Mano | May 29, 1934 |
| 2,170,949 | Morgan | Aug. 29, 1939 |
| 2,653,163 | Jacob | Sept. 22, 1953 |
| 2,680,127 | Slocombe et al. | June 1, 1954 |
| 2,714,607 | Matter | Aug. 2, 1955 |
| 2,768,154 | Unruh et al. | Oct. 23, 1956 |

OTHER REFERENCES

Siefken: Annalen der Chemie, volume 562, pages 75–136 (1948).